(12) United States Patent
Carbillet

(10) Patent No.: US 6,256,696 B1
(45) Date of Patent: Jul. 3, 2001

(54) INFORMATION PROCESSING SYSTEM COMPRISING AT LEAST TWO PROCESSORS

(75) Inventor: Alain Carbillet, Paris (FR)

(73) Assignee: U.S. Philips Corporation, New York, NY (US)

( * ) Notice: Subject to any disclaimer, the term of this patent is extended or adjusted under 35 U.S.C. 154(b) by 810 days.

(21) Appl. No.: 08/548,113

(22) Filed: Oct. 25, 1995

(30) Foreign Application Priority Data

Oct. 26, 1994 (FR) .................................................. 94 12825

(51) Int. Cl.⁷ ............................ G06F 13/36; G06F 13/362
(52) U.S. Cl. ........................ 710/113; 710/100; 710/113; 710/128; 710/129; 709/207; 709/208; 709/212; 709/213; 709/225; 709/227
(58) Field of Search ..................................... 395/290, 293, 395/200.03, 200.05, 200.06, 280, 325, 200.07, 200.08, 200.12, 308, 309; 340/172.5; 364/200; 710/110, 113, 100, 128, 129; 709/201, 208, 225, 212, 213, 227

(56) References Cited

U.S. PATENT DOCUMENTS

| 3,634,830 | * | 1/1972 | Baskin . |
| 4,209,839 | * | 6/1980 | Bederman . |
| 4,270,167 | * | 5/1981 | Koehler et al. . |
| 4,368,514 | * | 1/1983 | Persaud et al. . |
| 4,481,578 | * | 11/1984 | Hughes et al. . |
| 4,777,590 | * | 10/1988 | Durkos et al. . |
| 5,131,081 | * | 7/1992 | MacKenna et al. . |
| 5,568,617 | * | 10/1996 | Kametani . |

FOREIGN PATENT DOCUMENTS 2667175   3/1992   (FR) ............................... G06F/15/16

* cited by examiner

Primary Examiner—Rupal Dharia
(74) Attorney, Agent, or Firm—Peter Verdonk

(57) ABSTRACT

A data processing system comprises multiple modules interconnected via an inter-module bus. Each module comprises a processor connected to local peripherals via a local bus. The system enables the processor of a specific module to directly access the peripherals of another module via the inter-module bus and the other's module local bus.

10 Claims, 5 Drawing Sheets

INFORMATION PROCESSING SYSTEM COMPRISING AT LEAST TWO PROCESSORS

BACKGROUND OF THE INVENTION

1. Field of the Invention

The present invention relates to an information processing system comprising a plurality of modules which are notably constituted on the basis of a processor and of a local bus which serves various peripherals.

The invention likewise relates to telecommunications equipment comprising a plurality of modules which are notably constituted on the basis of a processor and of a local bus which serves various peripherals, and notably of a multiplexer of data transmitted according to the synchronous digital hierarchy (SDH).

2. Description of the Related Art

In many information processing systems, it is typical to utilize a plurality of processor-based modules for the purpose of redundance or for the purpose of distributing the information processing so as to increase the performance of the system. For example, it is possible to shift a processing-time consuming function to a dedicated module, or in telecommunications equipment, to use a first module dedicated to the management of the equipment, and a second module dedicated to the management of the communications.

The problem which then appears is that of getting the various modules to communicate with each other.

French Patent Application No. 2667175, filed by the Assignee on Sep. 25, 1990, describes a method for putting processors in communication via a common memory whose access is controlled by an arbitration circuit.

However, the arbitration circuits which are commercially available at present make it possible to manage only the dynamic memory. The field of application of such a method is thus limited.

SUMMARY OF THE INVENTION

It is notably an object of the invention to propose an information processing system which comprises a plurality of modules, and in which each processor of each module has the possibility of accessing all the peripherals of the other modules: dynamic and static memories, relays, electroluminescent lamps, communication elements . . . .

Therefore, an information processing system according to the invention and as defined in the opening paragraph is characterized in that it comprises an inter-module bus intended to serve as a temporary link between two modules, and connected to each module via at least one two-way buffer stage, and in that said modules comprise means enabling a processor of any first module to become temporarily the master of the local bus of any second module, so as to have direct access to the peripherals of said second module.

When there is no exchange of data, each processor is independent and works locally on its own bus by utilizing the resources which are connected thereto. On the other hand, when an exchange of data is necessary, for example, when the processor of a first module wishes to read the static memory of a second module, the processor of said second module is temporarily put in the stand-by mode, and that of said first module becomes the master of the local bus of said second module which is put in direct contact with the local bus of said first module via two-way buffer stages and an inter-module bus, so that an exchange of data takes place. Thus, the static memory of said second module is temporarily considered a peripheral of the processor of said first module.

These and other aspects of the invention will be apparent from and elucidated, by way of example, with reference to the embodiments described hereinafter.

DESCRIPTION OF PREFERRED EMBODIMENT

Figure 1:
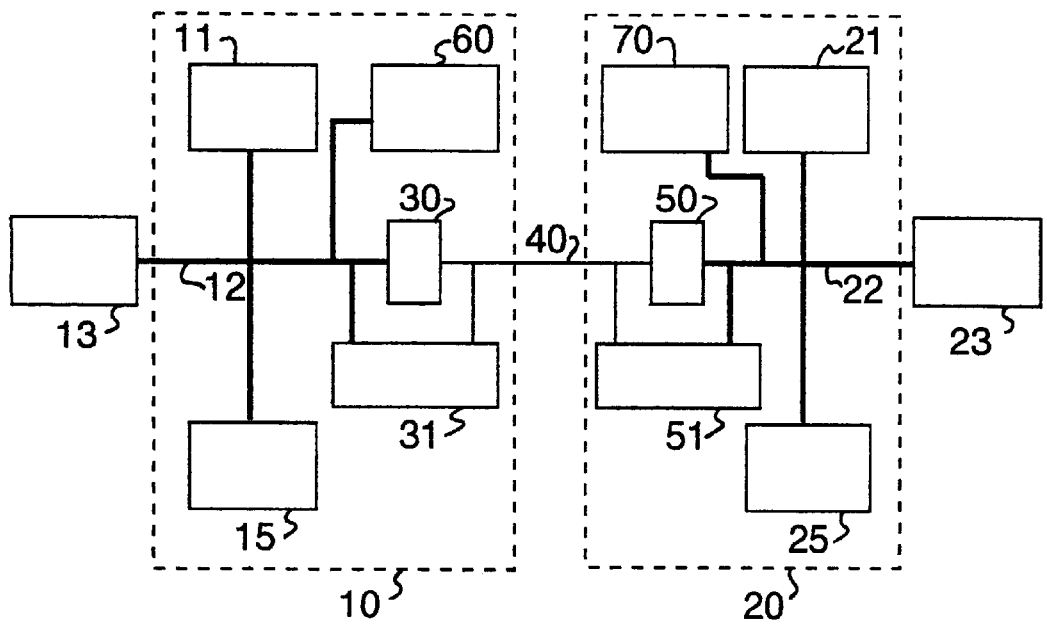
FIG. 1 diagrammatically shows the operating principle of a system according to the invention.

FIG. 1 is a diagrammatic representation of a system according to the invention based upon two modules 10 and 20 formed each by a processor and a local bus which serves various peripherals (in the following, an interconnection of two modules will merely be described for simplicity of the exposé, but this selection is not restrictive).

According to FIG. 1, module 10 comprises a processor 11 and a local bus 12 which serves, on the one hand, a peripheral 13 and, on the other hand, a memory 15. The bus 12 is connected via a two-way buffer stage 30 to an inter-module bus 40, and the two-way buffer stage 30 is controlled by an automaton 31 which exchanges data with the local bus 12 and with the inter-module bus 40. Similarly, the module 20 comprises a processor 21 and a local bus 22 which serves, on the one hand, a peripheral 23 and, on the other hand, a memory 25. The bus 22 is connected via a two-way buffer stage 50 to the inter-module bus 40, and the two-way buffer stage 50 is controlled by an automaton 51 which exchanges data with the local bus 22 and with the inter-module bus 40.

When the module 20 seeks to access a peripheral of another module (the module 10, for example), automaton 31 temporarily disconnects the processor 11 from bus 12 in favour of processor 21, and puts the buses 12 and 22 in direct contact via the two-way buffer stages 30 and 50, so that the peripherals of module 10 appear as additional peripherals of module 20 and the exchange of data can take place. On the other hand, when there is no exchange of data, each processor works independently as a local processor with its bus and accesses the peripherals connected to its own bus.

In a preferred embodiment of a system according to the invention, each module furthermore comprises a specific peripheral (60, 70, respectively) which is capable of transferring information streams via an access called DMA by directing the processors 11 and 21, respectively. This embodiment provides the advantage of making it possible to transfer various information signals via a single access to a remote local bus and, consequently, restricts the part that results from the mechanisms of seizing the local bus in the whole cycle period. Thus, each local bus can be used either by a local or a remote processor, or by a local or a remote peripheral dedicated to the DMA accesses.

Figure 2:
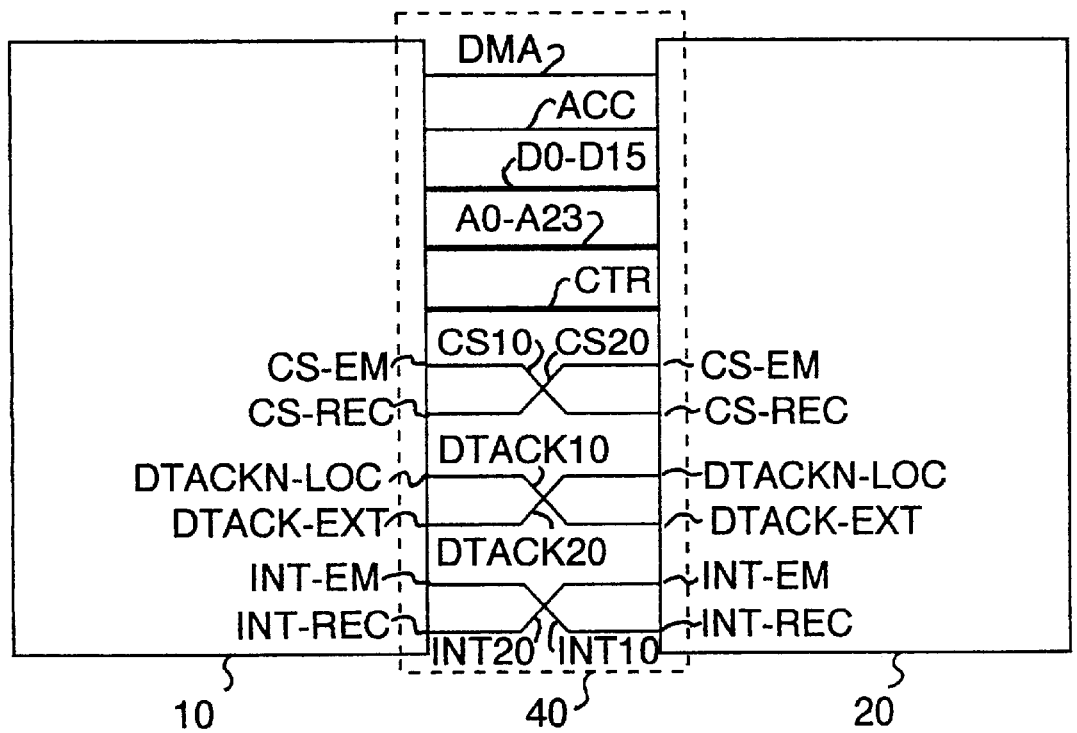
FIG. 2 shows in detail the interface between two modules in a particular embodiment of the invention.

FIG. 2 shows the interface between the two identical modules 10 and 20, which module 10 is furthermore described with reference to FIG. 3.

In the embodiment which will now be described, the processors 11 and 21 are of the Motorola 68000 family.

According to FIG. 2, modules 10 and 20 are connected by a set of wires which form the inter-module bus 40. A wire ACC produces an activating or de-activating signal for the two-way buffer stages 30 and 50 of each module. A line A0–A23 conveys the address codes of the master processor. A line D0–D15 makes it possible to exchange data codes between the two modules. A control line CTR transports three wires: a wire R/WN which features the type of access in the read or write mode and notably makes it possible to outline the direction of the two-way data buffer stages, and two wires UDSN and LDSN (Upper Data Strobe Not and Lower Data Strobe Not) which define the valid bits among the 16 data bits. A wire DMA indicates whether the current cycle forms part of an DMA access or not. Two wires CS10 and CS20 are connected, on the one hand, between a terminal CS-EM of module 10 and a terminal CS-REC of module 20 and, on the other hand, between a terminal CS-EM of module 20 and a terminal CS-REC of module 10, in order to transport the request signals for seizing a bus between the two modules. Two wires DTACK10 and DTACK20 (Data Transfer Acknowledge) are connected between, on the one hand, a terminal DTACK-EXT of module 10 and a terminal DTACKN-LOC of module 20 and, on the other hand, a terminal DTACK-EXT of module 20 and a terminal DTACKN-LOC of module 10, in order to transmit the end-of-cycle signals between modules. Finally, two wires INT10 and INT20 are connected between, on the one hand, a terminal INT-EM of module 10 and a terminal INT-REC of module 20 and, on the other hand, a terminal INT-EM of module 20 and a terminal INT-REC of module 10, to transmit interrupt signals between modules.

Figure 3:
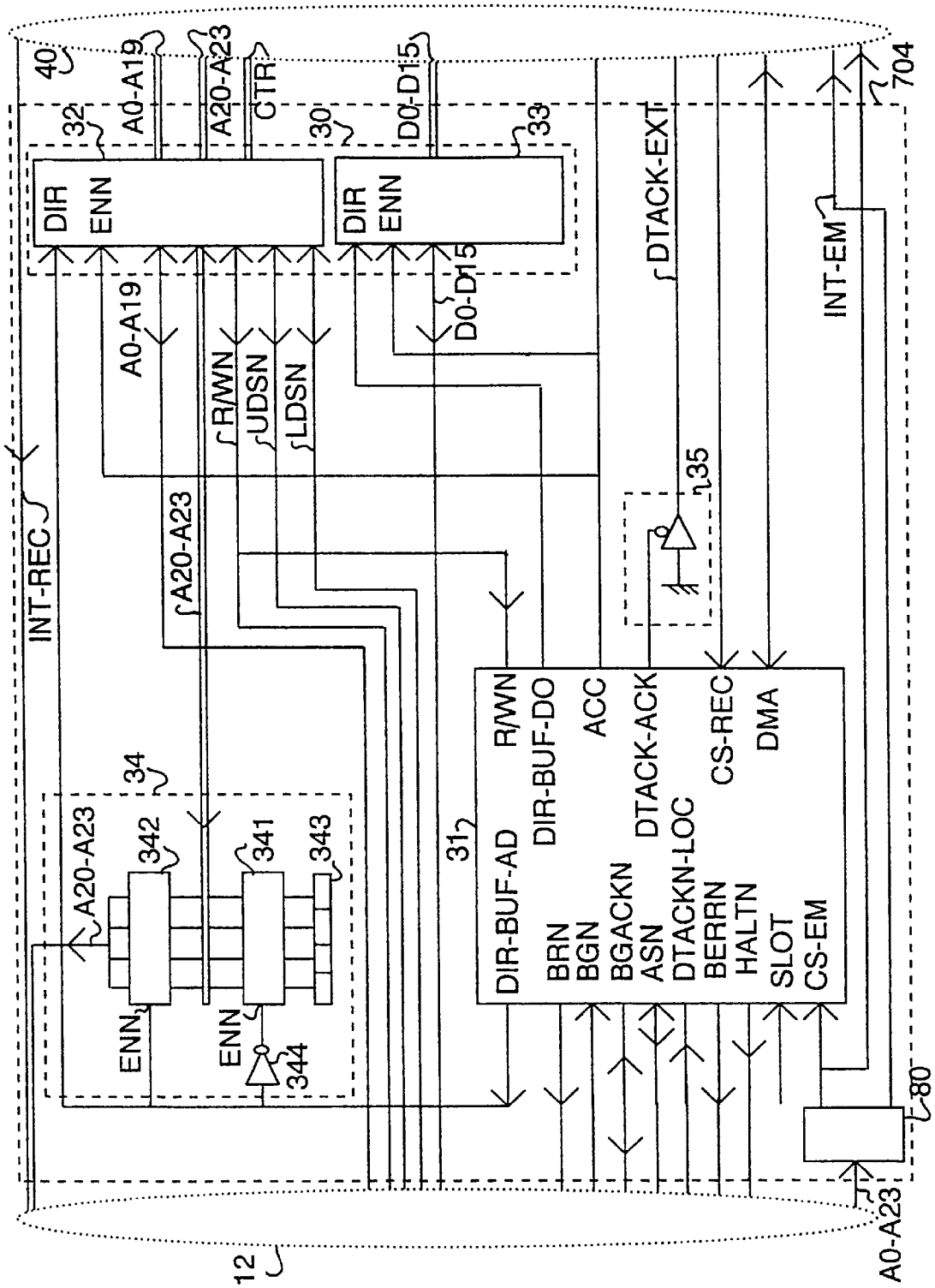
FIG. 3 shows a part of a module intended to be used in a system according to the invention (local bus, two-way buffer stages, automaton and inter-module bus)

FIG. 3 shows only the elements of module 10 which are used for implementing the invention, that is to say, an automaton 31 which is in this embodiment an EP910 or an EPL7032 manufactured by Altera, a two-way buffer stage 30 which is formed by a two-way address buffer stage 32 and a two-way data buffer stage 33, based each on components 74ABT245 manufactured by Philips Semiconductors, a local bus 12 and an inter-module bus 40. An overall view of an example of a module is given in FIG. 7.

The automaton 31 has the following terminals for transmitting or receiving signals to or from the local bus:

a terminal DATCKN-LOC intended to receive from the processor a signal that indicates that the data transfer has been achieved, an input terminal BGN (Bus Grant Not) intended to receive a signal that indicates that the processor will release the bus at the end of the current cycle, an output terminal BRN (Bus Request Not) intended to transmit to the processor 11 a signal that indicates thereto that another processor wishes to become the master of the local bus 12; this other processor waits for signal BGN to be activated and the local bus 12 to be released, an output terminal BERRN (Bus Error Not) and an output terminal HALTN which produce each a signal, which signals are used together for inducing the processor to a retry cycle when there is a problem for the current cycle, an input/output terminal BGACKN (Bus Grant Acknowledge Not) of a signal which is utilized, in the master module (module 20 in this example), to indicate that a dedicated peripheral (60, for example), is the master of the local bus 22 and that an DMA access is used, and, in the slave module (module 10 in this example), to indicate that the automaton 31 seizes the local bus 12, an input/output terminal ASN (Address Strobe Not) of a signal that indicates the presence of a valid address on the bus, thus forming a signal indicating the beginning of a cycle, an input terminal R/WN (Read/Write Not) intended to receive a signal that indicates whether a read or write cycle is concerned.

The automation 31 furthermore has terminals DMA and ACC to which the wires bearing the same name of the inter-module bus are connected. It further has:

a terminal CS-REC, which is connected to the terminal bearing the same name of module 10, a terminal CS-EM, which receives a request signal for seizing the local bus and which is connected to the terminal bearing the same name of module 10; in the embodiment that is described, the memory is structured in areas while each area is assigned to a given peripheral. This signal thus comes from an address decoder 80 which receives on its input the line A0–23 and selects on its output the peripheral concerned. The terminal CS-EM is thus connected to the outputs of the address decoder that correspond to the peripherals of module 20, a terminal DIR-BUF-DO, which is connected to the two-way data buffer stage 33 and which produces a signal that makes it possible to select the direction of the two-way data buffer stage depending on the state of the module (master or slave) and the type of access (read or write mode), a terminal DIR-BUF-AD, which is connected to the two-way address buffer stage 32 and also to a circuit 34 whose role will be explained in the following; this terminal also produces a signal that makes it possible to select the direction of the two-way address buffer stage depending on the state of the module (master or slave), a terminal DTACK-ACK, which is connected to the terminal DTACK-EXT of module 10 via a circuit 35 whose role will be described in the following, and a terminal SLOT, which indicates which of the two modules has priority over the other: in effect, when each of the two modules is connected to the inter-module bus via a connection slot, its priority is expressed in this embodiment by the number of said connecting slot (0 or 1).

The two-way data buffer stage 33 has the following terminals:

a terminal ENN, which is connected to the terminal ACC of the automaton 31 for receiving an activating or de-activating signal, two sets of 16 terminals called terminals A and terminals B, respectively, which terminals A are connected to the local bus, and terminals B to the inter-module bus, and are intended to receive data (in practice, the element 74ABT245 which is used having only two sets of 8 terminals each, this two-way buffer stage is in fact formed by two elements 74ABT245), a terminal DIR, which is connected to the terminal DIR-BUF-DO of automaton 31 and which makes it possible to select the direction of operation of the two-way buffer stage: when the signal it receives is active, the two-way buffer stage transmits the data from its terminals A to its terminals B, and vice versa when it is inactive.

The two-way address buffer stage 32 has the following terminals:

a terminal ENN, which is connected to the terminal ACC of automaton 31 to receive an activating or de-activating signal, two sets of 27 terminals called terminals A and B respectively, the terminals A being connected to the local bus and the terminals B to the inter-module bus. The first 20 terminals are intended to receive the first 20 address wires A0 to A19, the next three terminals are intended to receive three address wires A20 to A23 which are produced by the circuit 34 and, finally, the last three terminals are intended to receive the control signals R/WN, UDSN and LDSN which feature the type of access and determine the valid bits among the 16 data bits, a terminal DIR which is connected to the terminal DIR-BUF-AD of automaton 31 and makes it possible to select the direction of operation of the two-way buffer stage, so that when the signal it receives is active, the two-way buffer stage transmits the data from its terminals A to its terminals B, and vice versa when it is inactive.

In practice, the two-way buffer stages are structured around various 74ABT245 gate circuits.

Circuit 34 makes it possible to perform one operation per page. It is constituted of two gates 341 and 342 which have each four inputs and four outputs, and also of a control terminal ENN. The four inputs of gate 342 and the four outputs of gate 341 are connected to the terminals A20–A23 of the two-way address buffer stage 32. The four inputs of the gate 341 are connected to a register 343 which produces the four address bits A20 to A23 which define thus one page of 1 Mbyte, and its control terminal ENN is connected to the terminal DIR-BUF-AD of switch 31 via an inverter 344. In this manner the gate 341 is activated when the module is in the "master" state. The outputs of gate 342 are connected to the local bus and its control terminal is directly connected to terminal DIR-BUF-AD of automaton 31, so that the gate 342 is activated when the module is in the "slave" state.

In practice, the gates 341 and 342 are implemented on the basis of a 74F244 circuit manufactured by Philips Semiconductors.

Circuit 35 makes it possible to manage the ends of the cycles. It is constituted on the basis of a three-state gate which has an input, a control and an output. The input is connected to ground. The control is connected to the terminal DTACK-ACK of automaton 31 and the output is connected to terminal DTACK-EXT of module 10. Thus, when the module is in the "slave" state, the signal DTACK-EXT is activated as soon as the control DTACK-ACK has switched to the active level, which makes it possible to separate in a simple manner the phase of local clearance caused by the peripheral which relates to the automaton (DTACKN-LOC), and the phase of external clearance caused by the automaton which relates to the inter-module bus. The local clearance in effect calls for the utilization of a particular mechanism which separately manages the read cycles and write cycles for the slave module: during a write cycle it is necessary to put the local cycle to an end in order to guarantee that the data are sampled. Only then is the end-of-cycle signal to be transmitted on the inter-module bus. On the other hand, during a read cycle, the data to be read are to be maintained on the local bus until the external clearance.

Finally, the terminal INT-REC of module 10 is connected to an interrupt control terminal of processor 11 and terminal INT-EM is connected to an output of the decoder 80, so that a given address is dedicated to the switching of an interrupt.

Figure 4:
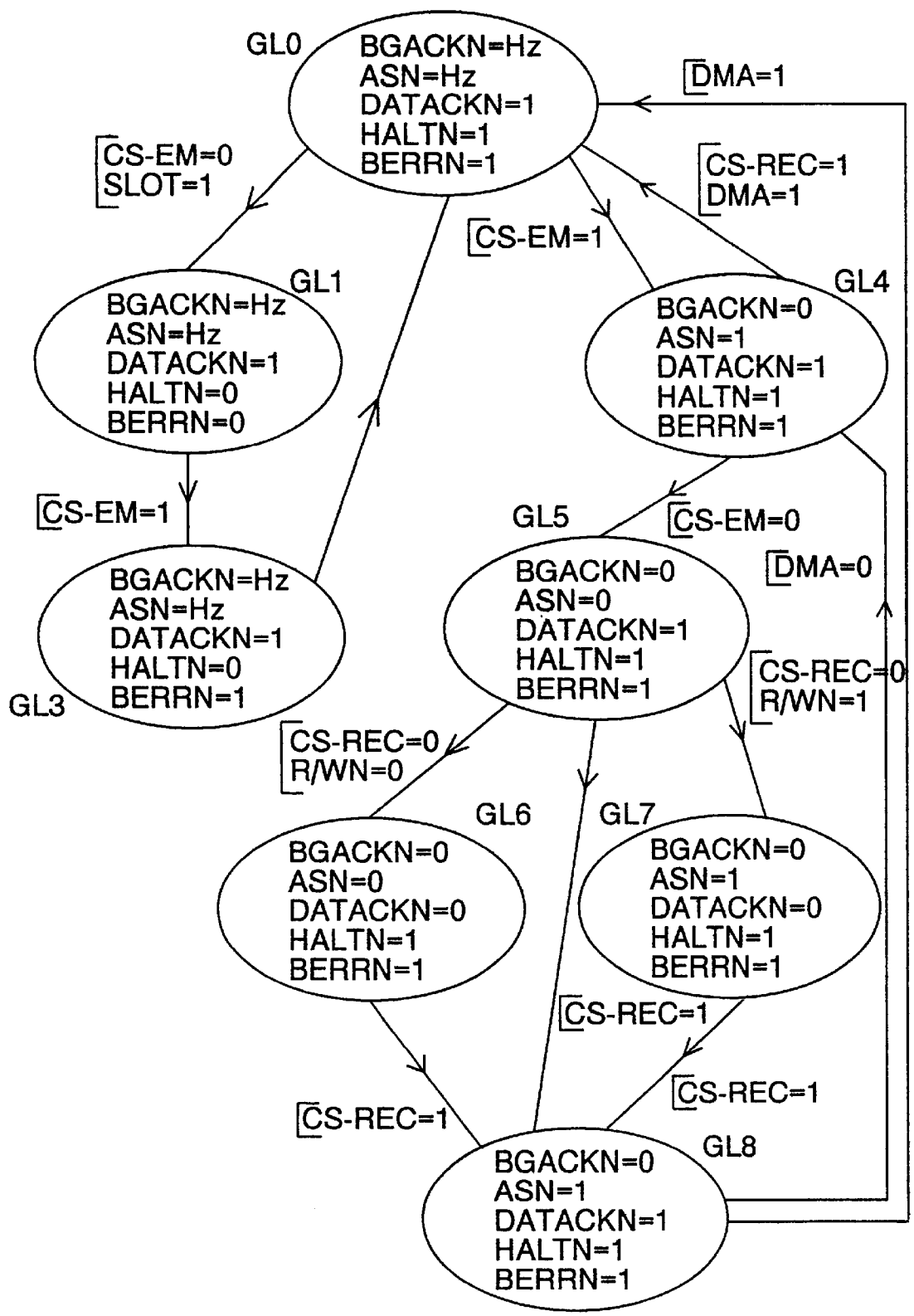
FIG. 4 represents a working diagram of said automaton.

The operation of the automaton 31, when module 10 is in the slave state, will now be described while reference is made to the flow chart of FIG. 4. In the following the signals will have the same names as the terminals of the automaton 31 on which they are sent.

The state of rest of the automaton (no request for access to the local bus) is the state GL0 which is featured by the values:

BGACKN=Hz
ASN=Hz
DTACKN-LOC=1
HALTN=1
BERRN=1 where Hz indicates a high-impedance inactive state, the value 1 corresponds to an inactive state and the value 0 to an active state.

When the automaton receives a request for access to its local bus (CS-REC=0), three cases may be distinguished:

First Case

If CS-EM=0 and SLOT=1, there is a conflict between the two modules which make each a request for access to the local bus of the remote module. The signal SLOT makes it possible to determine the priority of module 10. In this embodiment module 10 connected via slot 0 is considered to have priority over the module connected via slot 1. When SLOT=1, module 10 thus does not have priority and automaton 31 passes to state GL1 to resolve the conflict.

Second Case

If CS-EM=0 and SLOT=0, module 10 has priority and automaton 31 waits for the disappearance of the conflicting situation, that is to say, the passing of the signal CS-REC to the inactive state (CS-REC=1).

Third Case

If CS-EM=1, module 10 is not making a request for access to bus 22 and the automaton changes to the state GL4 as soon as bus 12 is free, that is to say, once BGN=0, BGACKN=1 and ASN=1.

In state GL1, the automaton carries out a retry cycle. This state is featured by the following values:

BGACKN=Hz
ASN=Hz
DTACKN-LOC=1
HALTN=0
BERRN=0

The signal BERRN indicates to the processor that there is a problem for the current cycle, and it interacts with the signal HALTN to request a retry. When CS-EM=1, the automaton changes to the state GL3.

The state GL3 corresponds to an end of the retry cycle and is featured by the following values:

BGACKN=Hz
ASN=Hz
DTACKN-LOC=1
BERRN=1
HALTN=0

The automaton then implicitly returns to the rest state GL0.

State GL4 corresponds to the seizure of the local bus 12 by the remote module 20 (BRN=CS-REC) and is featured by the following values:

BGACKN=0
ASN=1
DTACKN-LOC=1
BERRN=1
HALTN=1

Then, the automaton remains in the stand-by mode until the two-way address and data buffer stages are activated. The activation of the two-way buffer stages will be explained in the following with reference to the flow chart of FIG. 5. The state of activation of these buffer stages is featured by the values:

ACC=0
DIR-BUF-AD=0
DIR-BUF-DO=R/WN

If CS-REC=0, the automaton passes to the state GL5 from which instant on the buffer stages are activated. On the other hand, if CS-REC=1 and if DMA=1 (that is to say, if the current cycle does not form part of an DMA access), the automaton returns to the state GL0. Finally, between two transfers during a DMA cycle, one may have CS-REC=1 and DMA=0. In this case the automaton remains in the stand-by mode until CS-REC=0.

State GL5 corresponds to the access to the local bus and is featured by the following values:

BGACKN=0
ASN=0
DTACKN-LOC=1
BERRN=1
HALTN=1

The beginning of the cycle is thus triggered; the address and the control signals are sampled, the addressed peripheral is selected, so that the data can be put on the bus if a read cycle is concerned, or be sampled if a write cycle is concerned. When the peripheral transmits an end-of-cycle signal (DTACKN-LOC=0), the automaton changes to the state GL8 if CS-REC=1, to the state GL6 if CS-REC=0 and R/WN=0 and to the state GL7 if CS-REC=0 and R/WN=1.

The state GL6 corresponds to a reading cycle and is featured by the following values:

BGACKN=0
ASN=0
DTACKN-LOC=0
BERRN=1
HALTN=1

In this state, the automaton transmits a clearance signal to the module 20 (DTACK-ACK=0) while maintaining the data on the local bus (ASN=0). Then, when receiving the signal CS-REC=1, the automaton changes to the state GL8.

The state GL7 corresponds to a writing cycle and is featured by the following values:

BGACKN=0
ASN=1
DTACKN-LOC=0
BERRN=1
HALTN=1

In this state, the automaton transmits a clearance signal to the module 20 only after transmitting an end-of-local-cycle signal (ASN=1) to the peripheral in order to enable data to be written. Then, when reception of the signal CS-REC=1, the automaton changes to the state GL8.

The state GL8 is featured by the following values:

BGACKN=0
ASN=1
DTACKN-LOC=1
BERRN=1
HALTN=1

This state corresponds to the end of the inter-module access cycle and to the waiting for the release of the two-way address and data buffer stages. This state of release will be described in FIG. 5; it is featured by the values:

ACC=1
DIR-BUF-AD=1
DIR-BUF-DO=1

When the state of release is reached, if DMA=1 (the running cycle does not form part of an DMA access), the automaton changes to the state GL0. On the other hand, if DMA=0, it changes to the state GL4.

Figure 5:
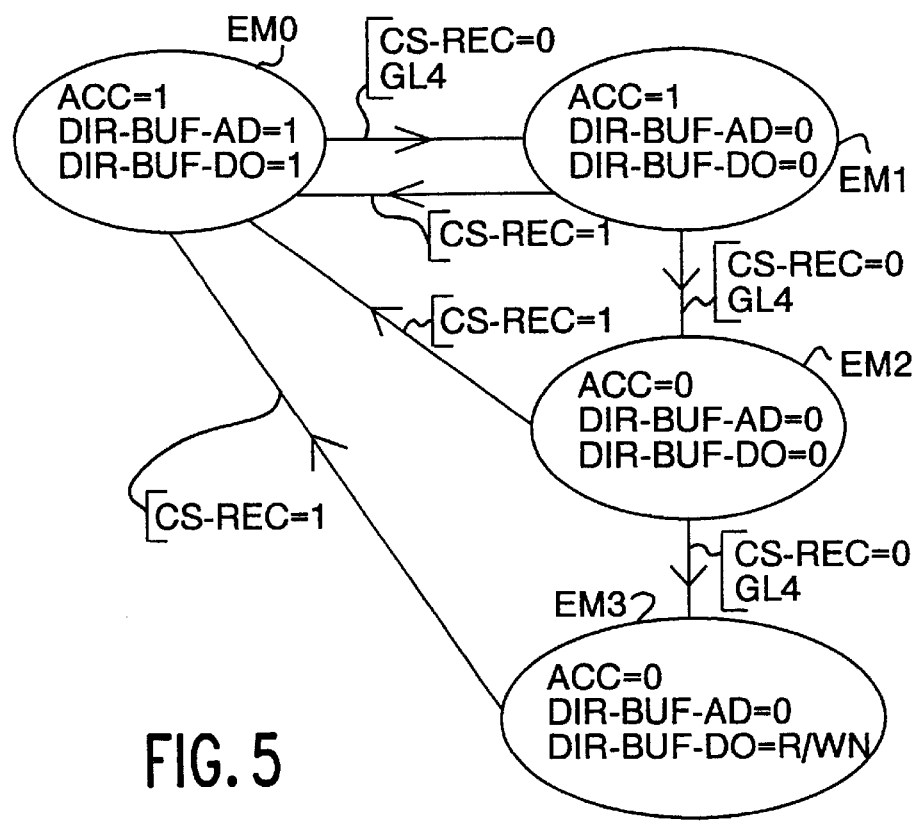
FIG. 5 represents a detail of the diagram shown in FIG. 4, FIG. 6 diagrammatically shows an example of a telecommunications equipment according to the invention, and FIG. 7 diagrammatically shows an example of a module intended to be used in the equipment as described in FIG. 6.

The mechanism of activating and releasing two-way address and data buffer stages will now be described with reference to FIG. 5.

The state EM0 corresponds to a state of rest in which the switch waits for a seizure of the local bus (state GL4). This state is featured by the following values:

ACC=1
DIR-BUF-AD=1
DIR-BUF-DO=1

The buffer stages are directed towards the exterior. When the automaton is in state GL4 and it receives the signal CS-REC=0, it changes to the state EM1.

The state EM1 consists of directing the buffer stages to the interior. It is thus featured by the following values:

ACC=1
DIR-BUF-AD=0
DIR-BUF-DO=0

When the automaton is in the state GL4 and receives the signal CS-REC=0, it changes to the state EM2. On the other hand, if CS-REC=1 is received, it returns to the state EM0.

The state EM2 consists of enabling the buffer stages. It is thus featured by the following values:

ACC=0
DIR-BUF-AD=0
DIR-BUF-DO=0

When the automaton is in the state GL4 and receives the signal CS-REC=0, it changes to the state EM3. On the other hand, if CS-REC=1, it returns to the state EM0.

The state EM3 consists of directing the two-way data buffer stage in response to the signal R/WN and then waiting for the end of the local access. It is thus featured by the following values:

ACC=0
DIR-BUF-AD=0
DIR-BUF-DO=R/WN

As soon as it has received a signal CS-REC=1, the automaton returns to the state EM0.

It is important to note that for a correct operation of such an automaton it is necessary to resynchronize (via a flip-flop, for example) the signals CS-REC and DTACK-LOC received by the module 10 and coming from module 20.

Furthermore, the module that has just been described is advantageously formed by a Motorola 68302 processor. Such a processor which is based on a Motorola 6800 processor, has the advantage of integrating many functions such as an address decoder, a peripheral dedicated to the DMA accesses . . . . , . . . .

Figure 6:
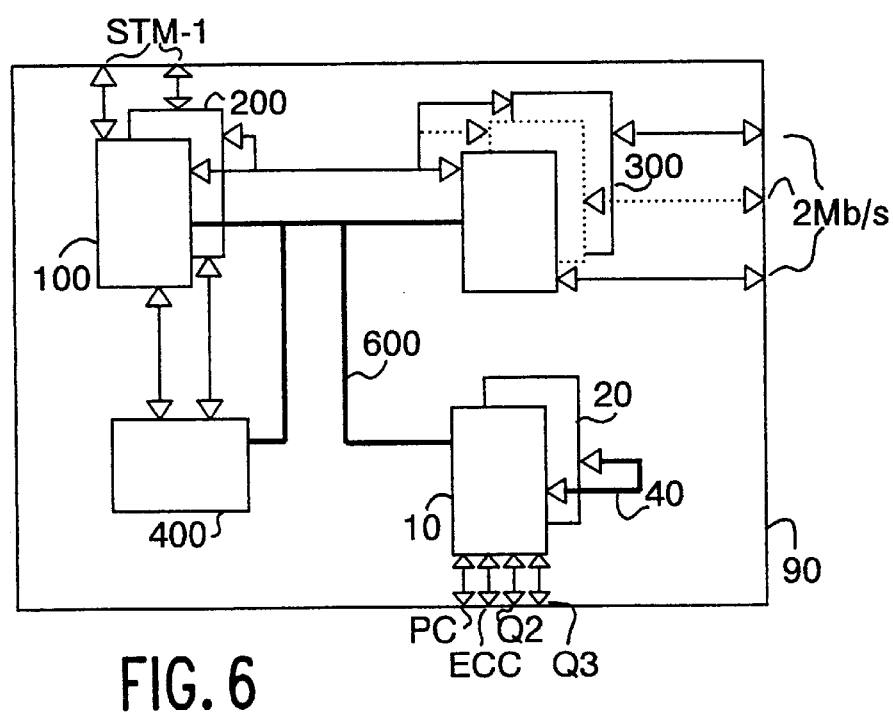

FIG. 6 represents a data multiplexer in the synchronous hierarchy which utilizes an information processing system as described above. Such equipment is described in the article "The ADM 155 and the setting up of synchronous access networks" by N. Dupré La Tour, Y. Guedes and B. Salle, published in the journal Commutation and Transmission No. 1, 1992.

According to FIG. 6 such an equipment 90 notably comprises:

two modules 100 and 200, which have an STM1 interface and whose main role is to packetize and depacketize the information signals they receive or transmit on a 135 Mbit/s transmission medium, a plurality of modules 300, which have a 2 Mbit/s interface and whose role is to packetize data received at a rate of 2 Mbit/s into a synchronous frame, at least one transfer module 400, whose role is to transfer low-rank virtual paths between the STM-1 interfaces, two supervisory modules 10 and 20 which are connected by an inter-module bus 40 and whose role is notably to manage the configuration of the equipment, the alarms and the quality of the communications, the various processes being divided between the two modules. These supervisory modules furthermore have, on the one hand, an interface of the V24 type, denoted PC, for connecting to a local station that ensures the management of the equipment and, on the other hand, ensures the connection to an aggregate network management system, an interface Q3 to a local area network of the Ethernet type, an interface Q2 to a network of the X25 type and lines ECC (Embedded Communication Channel) for a connection to supervisory cards of neighbouring pieces of equipment. The supervisory modules furthermore have an interface of the V24 type to a bus 600 included in the equipment to ensure the communication between the various modules that have just been mentioned.

Figure 7:
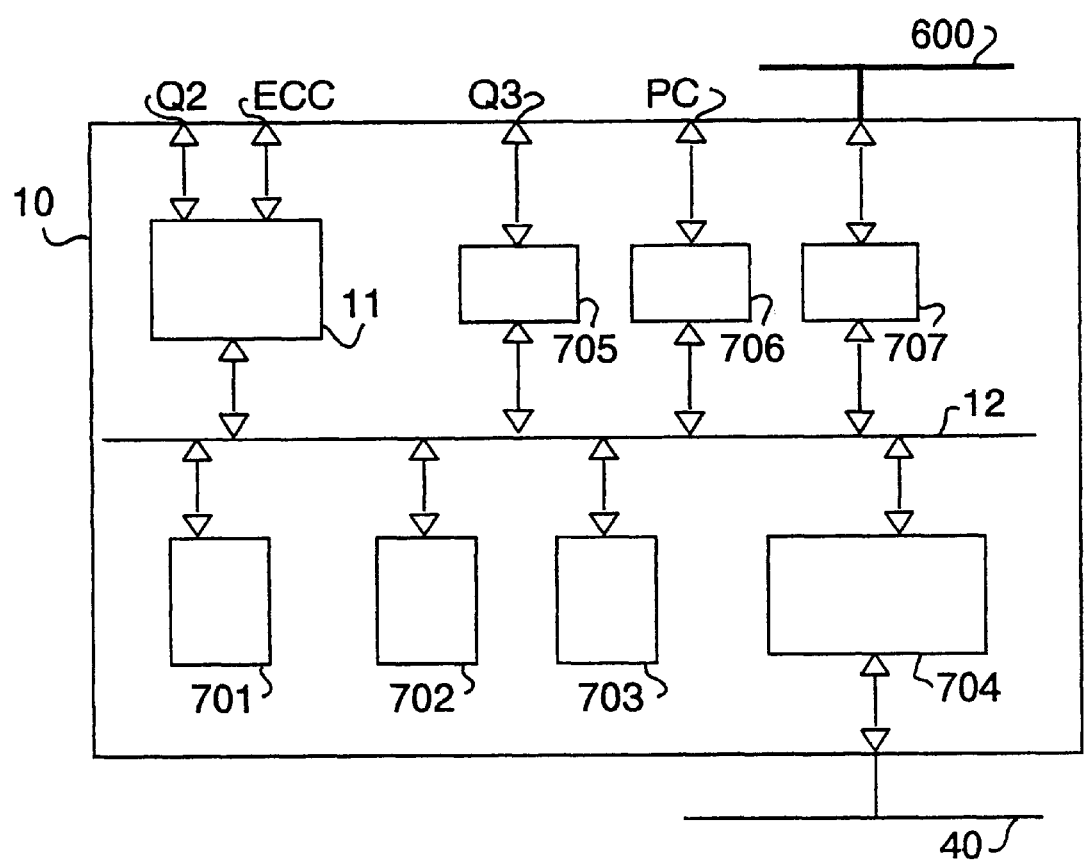

FIG. 7 gives a detailed representation of the module 10. It comprises an ensemble of a microprocessor 11 formed by a processor of the Motorola 68000 family which has an interface Q2 to a network of the X25 type, and at least one interface ECC to supervisory modules of other pieces of equipment, and which microprocessor is connected to the local bus 12. An EPROM memory 701, a backing storage 702 and a dynamic memory 703 form peripherals of said module and are also connected to the local bus just like the ensemble 704 of the circuits of FIG. 3 which manage the access to the inter-module bus 40. The local bus 12 is also connected to a management circuit 705 for an interface of the Q3 type to a local area network of the Ethernet type, to a management circuit 706 for an interface of the V24 type to a local computer which ensures the management of the equipment, and to a management circuit 707 for the access to the internal bus 600 of the equipment.

Needless to observe that variants may be provided to the embodiment that has just been described. Notably the DMA peripherals 60 and 70 are not indispensable for the operation of the invention; however, they make it possible to make an improvement in the performance of the system.

Likewise, a mechanism has been described according to which the priority of the various modules is a function of the number of the connecting slot via which they are connected. This mechanism provides the advantage of being particularly simple to implement, but other mechanisms can be used such as, for example, a priority by rotating mechanism (the priority is given by rotation to a different module with each new conflict), or a chained-priority mechanism (the modules are chained in the order of priority and each module has an input priority wire, which produces a signal that indicates whether there is an active module with a higher priority, and an output priority wire which produces a signal that indicates whether the module is the active module with the highest priority). The latter mechanism is particularly interesting when the system comprises a large number of modules.

Finally, it will be obvious that the invention can be applied to any type of processor whatever the size of its bus.

What is claimed is:

1. An information processing system comprising a plurality of modules and an inter-module bus, each respective one of the modules including a respective processor and a respective local bus, the respective local bus serving one or more respective peripherals, the inter-module bus serving as a temporary link between at least two of the modules, the inter-module bus being connected to each respective one of the modules via at least a respective two-way buffer stage, the system including circuitry for enabling the processor of any of the modules to become temporarily a master of the local bus of any other of the modules, so as to have direct access to the peripherals of the other of the modules, and for disconnecting the processor of the other module from the local bus of the other module.

2. The information processing system of claim 1, wherein each module comprises:

means for emitting a request signal for access to the local bus of a second module when an address present on its own local bus corresponds to an address of a peripheral of said second module, and a management automaton for its own local bus.

3. The information processing system of claim 1, wherein said modules are identical.

4. The information processing system of claim 3, wherein at least one of said modules comprises a specific peripheral intended to take the place of the processor of said module so as to perform information stream transfers.

5. The information processing system of claim 4, further comprising conflict management means to assign the local bus to the module that has the highest priority.

6. The information processing system of claim 5, wherein each module is connected to the inter-module bus via a connecting slot and has priority that is a function of the number of said connecting slot.

7. The information processing system of claim 2, wherein at least one of said modules comprises a specific peripheral intended to take the place of the processor of said module so as to perform information stream transfers.

8. The information processing system of claim 1, wherein at least one of said modules comprises a specific peripheral intended to take the place of the processor of said module so as to perform information stream transfers.

9. The information processing system of claim 1, wherein said modules are identical.

10. Telecommunications equipment comprising a plurality of modules and an inter-module bus, each respective one of the modules comprising a respective processor and a respective local bus, the respective local bus serving one or more respective peripherals, the inter-module bus serving as a temporary link between at least two modules, the inter-module bus being connected to each respective one of the modules via at least a respective two-way buffer stage, the equipment including circuitry for enabling a processor of any of the modules to become temporarily a master of the local bus of any other of the modules, so as to have direct access to the peripherals of the other module, and for disconnecting the processor of the other module from the local bus of the other module.

* * * * *